Sept. 14, 1926.　　　　　　　　　　　　　　1,599,486
J. H. POPE
CONTROLLING MEANS FOR NAIL TRANSFERRING MECHANISMS
Filed May 15, 1923
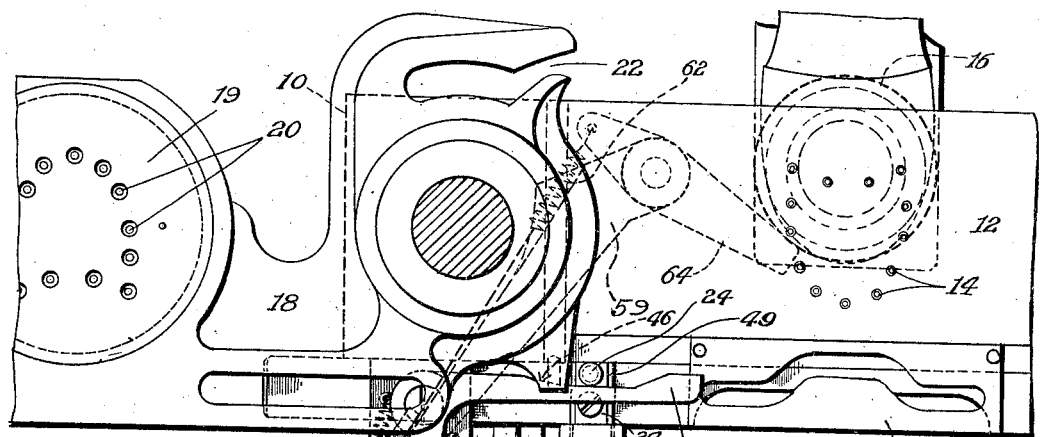
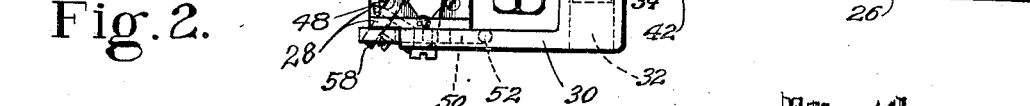
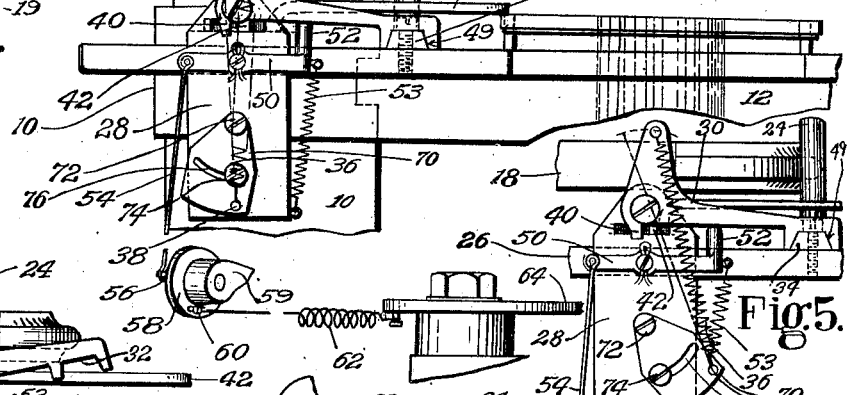
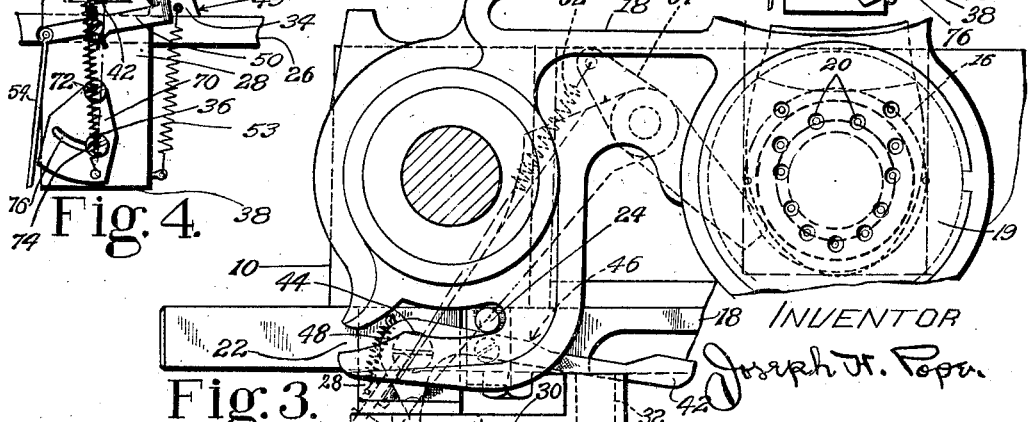
INVENTOR
Joseph H. Pope Patented Sept. 14, 1926.

1,599,486

UNITED STATES PATENT OFFICE.

JOSEPH H. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY.

CONTROLLING MEANS FOR NAIL-TRANSFERRING MECHANISMS.

Application filed May 15, 1923. Serial No. 639,192.

This invention relates to means for controlling mechanisms for transferring such fasteners as nails from a receiving station, as that at which they are supplied by an operator's assistant or by a distributing mechanism, to a delivering station, this being the point at which they are utilized, as by the nailing mechanism of a heel-attaching machine.

It is an object of the invention to guard against a plural delivery of nails by the transferring mechanism to the nailing mechanism without an intermediate driving operation. Such plural delivery, which, under ordinary conditions, is quite likely to occur because of failure of the assistant to remember whether or not he has made the delivery since the preceding nailing operation, may cause injury to the machine and mutilation of the work through the striking of the superposed nails by the drivers.

In the attainment of this object, a feature of the invention concerns the employment of a member which controls the operation of the machine to also govern the transferring mechanism and its own movement. Heel-attaching machines of the Lightning type, or that disclosed in Patent No. 446,885, Pope, Feb. 24, 1891, are equipped with a safety device, in the form of a sliding member movable by the nail-loader in such a manner that the machine may be started only when the loader is clear of the nailing mechanism. To a member of this character I apply a lock, which, actuated by and preventing the movement of this safety member, also retains the loader against being carried for a second time into the delivering position, until something has occurred in the cycle of operation of the machine which renders it reasonably certain that the previous load of nails has been disposed of. That which determines the unlocking of the transferring mechanism, I prefer to be an incident to another act performed by the operator, so he will be required to give no thought to the control. This act, as herein disclosed, involves the movement of the work-support or jack, there being connections between the jack and a lever, or other member, which locks the slide. It is desired to point out that this application of the work-support to the release of the transferring mechanism need not include in the connecting chain the slide which controls the machine, it being believed to be novel to employ this agency to free the loader, regardless of the particular manner in which it is connected.

A further feature of the invention is directed to a shifting of the control of the locking member from one element of the machine to another. By so doing I may, for example, cause the locking of the loading mechanism, as well as its unlocking, to be dependent upon the position of the work-support alone. This is desirable under some conditions of operation, in that it insures the presence of the work-support or jack beneath the die-block-openings, and gives certainty of the retention of the nails in the openings, ready for driving. The lever or other member which locks the loader has associated with it a member, as a spring, which may retain it in the position to which it is moved. This retaining member I arrange adjustably to permit the altering of the direction of application of its force. By this means, it may be made to hold the locking member either alternately effective and ineffective, or to exert a constant effective tendency. This results in the change of control previously mentioned.

The accompanying drawing illustrates one of the several forms which my invention may assume.

Fig. 1 being a rear elevation of a portion of a heel-attaching machine, with its nail-loading mechanism to which my improved controlling means is applied;

Fig. 2, a plan view of the same, the drivers being omitted;

Fig. 3, a view similar to Fig. 2, but showing the elements in the nail-delivering, rather than the nail-receiving position;

Fig. 4, a front elevation of the controlling levers for the loader, the locking lever here being in a position to release the loader; and Fig. 5, a like view, with the spring adjusted to maintain the locking lever constantly effective.

Of a Lightning heeling machine there is shown in the drawing a portion of its frame 10, the die-block 12, in which are openings 14 to receive the attaching nails, the reciprocatory drivers 15 co-operating with the openings, the jack 16, which moves from a position in which the operator places the work upon it to one in which said work is held beneath the die-block for the nailing operation, and a loader-arm 18 carrying a loader-block 19, in the receiving openings 20 of which nails are transferred from the position shown in Fig. 2 of the drawing to that over the die-block, as is illustrated in Fig. 3. In this nail-delivering movement, the loader-arm oscillates about a portion of the frame, this movement causing the wall of a cam-groove 22 to engage a vertical pin 24 rising from a safety-bar 26 mounted to slide at the rear of the die-block. The safety-bar has connections, not shown, but which may be as in the patent already referred to, which act to lock the starting lever of the machine as the loader-block approaches the die-block, where it would interfere with the driver-assembly in its vertical reciprocation, and produces a reverse movement of the bar to release the starting lever when the loader-arm is swung away from the die-block, so that it is clear of the path of the driver-assembly.

Fixed to the rear of the frame is a bracket 28, having a horizontal portion, by which it is secured, and vertical portions extending upwardly and downwardly therefrom. Fulcrumed at the upper extremity of the vertical portion of the bracket 28 is a lever 30 having, at the under side of the outer end of a generally horizontally extending arm, a locking depression 32, which may be brought over a projection 34 from the top of the safety-bar and thus hold this bar against movement. This projection may be furnished by the base or enlargement by which the pin 24 is secured to the bar. The lever 30 is shown as of the bell-crank type, having a substantially vertical arm engaged by a yieldable retaining member furnished by a helical spring 36, the opposite extremity of which spring is fixed at 38 to a pin carried at the lower portion of the bracket 28. As appears in Figs. 1 and 4 of the drawing, the spring 36 exerts its tension upon either side of the fulcrum of the connected lever 30 when this is in a raised or a lowered position, to hold the depression 32 out of or into locking engagement with the projection 34 of the safety-bar, so that it acts to maintain said lever in either of the two opposite positions, yielding to permit its oscillation therefrom to the alternate position.

To move the lever 30 from its inactive position, in which the depression is out of engagement with the projection 34 and the safety-bar is free to move, to its active relation, in which the bar is locked by the lowering of the lever-depression upon the projection, this locking lever 30 has, depending from it beneath its fulcrum, a projection 40, with which co-operates the short forwardly-extending arm of a bell-crank lever 42, shown as fulcrumed upon the horizontal portion of the bracket 28. A longer arm of the lever 42 lies in a direction generally parallel to the long arm of the lever 30, when the latter is in its lowered or locking relation, but somewhat above this, it having a cam-surface 46, which is drawn into contact with the pin 24 by a spring 48 joining the lever 42 and the bracket. As the loader-arm is swung from its nail-receiving to its nail-delivering position, the outer end of the cam-slot 22 co-operates with the pin 24 to move this pin to the left, as viewed in Figs. 1 and 2 of the drawings, and thus carry the safety-bar in the same direction to lock the starting lever. As the pin and bar are thus moved, the former swings the long arm of the lever 42 outwardly, or toward the rear of the machine, bringing the short arm into engagement with the projection 40, and thus shifting the lever 30 from the position illustrated in Fig. 4 to one in which said lever 30 rides upon the upper face of the bar. Upon the return of the loader-arm, after the nails have been discharged into the die-block, the outer portion of the cam-slot again acts upon the pin 24 to restore the safety-bar to its initial position. This opposite movement of the bar brings an inclined edge 49 of its projection 34 against the side of the end of the lever in which is the depression 32, lifting it and then allowing it to fall, as appears in Fig. 1, the bar-projection 34 receiving the depression 32 of the lever. This occurs just as the outer extremity of the cam-slot 22 is leaving the pin, and the action of the safety-bar in releasing the starting lever is completed. Now, since the safety-bar is locked by the lever 30 against movement, the loader-arm is correspondingly locked, as regards its oscillation toward the die-block past the angle at which the cam-slot engages the pin. This bars the loader-block from being carried over the die-block to make a second delivery of nails thereto until the lever 30 has been lifted from the bar-projection 34.

To free the loader-arm so it may again transfer nails to the die-block, there is fulcrumed upon the front of the bracket 28 a generally horizontally extending lever 50, having an upward projection 52 arranged for engagement with the under side of the lever 30 between its fulcrum and the depression 32. A spring 53, joining the end of the lever in proximity to the projection 52 to the edge of the bracket 28, holds said projection normally lowered. To the opposite extremity of the lever 50 is articulated a connecting-rod 54, joined at its lower end to a crank-pin 56 projecting from the face of a disk 58 rotatable upon a bracket 59 carried by the frame. The disk 58 has, upon its face opposite the pin 56, a second crank-pin 60, united by a spring-connection 62 with a lever 64 fulcrumed upon the frame near the ways in which moves the jack 16, and having one arm extending into the path of the base-portion of the jack, contact between these elements occurring when the jack is forced into the nailing position. When the jack is at the opposite extreme of its movement, or in the work-receiving position, the spring 53, through the intermediate connections, holds the contact-end of the lever 64 forward. Then, when the jack with the supported work is slid rearwardly, its contact with the lever 64 swings this upon its fulcrum, this movement being transmitted through the spring 62 to the disk 58 to rotate this, and through the rod 54 to the lever 50, forcing the projection 52 against the lever 30 and carrying the depression 32 away from the projection 34 to free the safety-bar. Since this safety-bar is now unlocked, the loader-arm may actuate this, and can, therefore, itself be moved over the die-block for another delivery of nails thereto. When thus elevated by the lever 50, the lever 30 is temporarily retained in its inactive position by the transfer of the force of the spring 36 to the other side of the fulcrum of the lever 30. The spring 62 in the connections between the levers 64 and 50 allows a yield, which compensates for greater travel of the jack than is necessary to effect the unlocking movement of the lever 50.

To summarize briefly the operation of the controlling means, it may be said that, with the elements in the relation best illustrated in Fig. 2, the position of the locking lever 30 being more clearly shown in Fig. 4, the operator's assistant may swing the loader-arm 18, the lock of which he has supplied with nails, over the die-block (see Fig. 3), where such nails are deposited by the release of the usual shutter. During this travel, as the loader-block approaches the die-block, the action of the cam-slot 22 upon the pin 24 shifts the safety-bar to lock the starting lever, and, also, upon the return of the loader-arm, drops the locking lever 30, to allow it to engage the projection 34 of the safety-bar, by the actuation of the lever 42 by the pin. The elements have assumed the relation shown in Fig. 1, the safety-bar and loader-arm being locked. The operator now pushes in the jack to the nailing position, at which time, in the natural course of operation, he at once starts the machine to drive the nails from the die-block-openings into the work. A point in the cycle having been reached at which the previously delivered charge of nails has been utilized, the loader is released for the succeeding delivery, this being accomplished by the contact of the jack with the lever 64, which, by its connection to the lever 50, raises the locking lever to free the safety-bar. This returns the locking lever to the relation illustrated in Fig. 4, where it is held by its spring 36 for the following operation.

It may be desired that the loader be free to reach the nail-delivering position only when the jack is beneath the die-block. To bring this about, the mechanism is so organized that the control of the locking of the safety-bar 26 may be shifted from the loader-arm to cause this function to be performed wholly by the spring 36. To adapt the spring to give a constantly effective locking tendency, its attachment-pin 38 extends horizontally from the lower portion of a plate 70, pivoted at 72 upon the front of the bracket 28 and being capable of being fixed in two extreme positions by a screw 74 passing through a slot 76 in the plate and threaded into the bracket. As has already been pointed out in describing the arrangement of Figs. 1 and 4, in which the plate 70 is at one of its extreme adjustments, the force of the spring 36 is then exerted at opposite sides of the fulcrum to hold the lever 30 either raised or lowered. At this time, the locking of the loader is dependent upon the lever 42. At the opposite extreme of adjustment of the plate, as shown in Fig. 5, the spring acts always at one side of the fulcrum, its force now being constantly exerted to hold the lever 30 in its locking position, unless this is overcome by the influence of the lever 50 controlled by the travel of the jack. Starting, then, with the safety-bar locked, as in Fig. 1, the operator's assistant cannot carry the loader-arm into the nail-delivering position until the jack is beneath the die-block, at which time the lever 30 has been raised to unlock the bar and, therefore, the loader-arm. After the nailing of the heel has been accomplished and the jack drawn out and the lever 50 released, the loader-arm is again held against movemnet over the die-block until the jack is returned to the nailing position.

Having described my invention, what I claim as new and desire to secure by Letters Patent of the United States is:—

1. In a machine of the class described, the combination with mechanism for inserting fasteners, of mechanism for transferring fasteners to said inserting mechanism, and a member movable by the transferring mechanism for controlling the operation of the machine, said member being arranged to govern the transferring mechanism and also to control its own movement.

2. In a machine of the class described, the combination with mechanism for inserting fasteners, of mechanism for transferring fasteners to said inserting mechanism, a member movable by the transferring mechanism for controlling the operation of the machine, and means acting during the movement of the transferring mechanism for locking said member to limit the movement of said transferring mechanism.

3. In a machine of the class described, the combination with nailing mechanism, of mechanism for transferring nails to the nailing mechanism, a member movable by the transferring mechanism for controlling the operation of the machine, and means actuated by the member in its movement for locking said member to limit the movement of the transferring mechanism.

4. In a machine of the class described, the combination with nailing mechanism and a movable work-support, of mechanism for transferring nails to the nailing mechanism, a member movable by the transferring mechanism for controlling the operation of the machine, means for locking said member to limit the movement of the transferring mechanism, and means actuated in the movement of the work-support for unlocking the member.

5. In a heel-attaching machine, the combination with nailing mechanism, of a nail-loading mechanism delivering thereto, a member movable by the loading mechanism for preventing the operation of the machine, and a lock for said member, such lock being actuated in the movement of the member.

6. In a heel-attaching machine, the combination with nailing mechanism, of a loader-arm movable from a nail-receiving position to a delivering position at the nailing mechanism, a slide movable by the loader-arm to prevent the starting of the machine as the loader-arm approaches the nail-delivering position, and a lock for the slide arranged for engagement by said slide during its travel.

7. In a heel-attaching machine, the combination with nailing mechanism and a jack co-operating therewith, of a loader-arm movable from a nail-receiving position to a delivering position at the nailing mechanism, a slide movable by the loader-arm to prevent the starting of the machine as the loader-arm approaches the nail-delivering position, a lock for the slide, and connections between the jack and lock for releasing said lock.

8. In a heel-attaching machine, the combination with nailing mechanism, of a loader-arm movable from a nail-receiving position to a delivering position at the nailing mechanism, a slide movable by the loader-arm as said loader-arm approaches the nail-delivering position, and a lock for the slide applied by said slide in its movement to prevent the starting of the machine.

9. In a heel-attaching machine, the combination with nailing mechanism and a jack co-operating therewith, of a loader-arm movable from a nail-receiving position to a delivering position at the nailing mechanism, a slide movable by the loader-arm to prevent the starting of the machine as the loader-arm approaches the nail-delivering position, a lock for the slide applied by said slide in its movement, and connections between the jack and lock for releasing said lock.

10. In a machine of the class described, the combination with nailing mechanism and a movable work-support co-operating therewith, of mechanism for transferring nails to the nailing mechanism, means for holding the transferring mechanism against movement, and controlling connections between the work-support and holding means.

11. In a machine of the class described, the combination with nailing mechanism and a movable work-support co-operating therewith, of mechanism for transferring nails to the nailing mechanism, means for limiting the movement of the transferring mechanism, and means controlled by the work-support for releasing the movement-limiting means.

12. In a machine of the class described, the combination with nailing mechanism and a movable work-support co-operating therewith, of mechanism for transferring nails to the nailing mechanism, means actuated by the transferring mechanism for limiting the movement of such transferring mechanism, and means actuated by the movement of the work-support for releasing the movement-preventing means.

13. In a heel-attaching machine, the combination with nailing mechanism and a jack co-operating therewith, of loading mechanism delivering to the nailing mechanism, and a lock for the loading mechanism controlled by the jack.

14. In a heel-attaching machine, the combination with nailing mechanism and a movable jack co-operating therewith, of a loader-arm movable from a nail-receiving position to a delivering position at the nailing mechanism, a locking lever for the arm, and connections to the locking lever actuated by the jack.

15. In a heel-attaching machine, the combination with nailing mechanism and a movable jack co-operating therewith, of a loader-arm movable from a nail-receiving position to a delivering position at the nailing mechanism, a locking lever for the arm, connections between the loader-arm and lever for moving said lever to lock the loader-arm, and connections between the jack and lever for moving said lever to release the loader-arm.

16. In a heel-attaching machine, nailing mechanism, a movable nail-loader co-operating therewith, a lever movable between a position in which the loader is free and a position in which said loader is locked against delivery, and a lever movable into engagement with the locking lever to release the loader.

17. In a heel-attaching machine, nailing mechanism and a co-operating jack, a movable nail-loader co-operating therewith, a lever movable between a position in which the loader is free and a position in which said loader is locked against delivery, a lever acting upon the locking lever to release the loader, and connections between the releasing lever and the jack.

18. In a heel-attaching machine, nailing mechanism, a movable nail-loader co-operating therewith, a lever movable between a position in which the loader is free and a position in which said loader is locked against delivery, a lever acting upon the locking lever to produce locking movement, and a lever acting upon the locking lever to release the loader.

19. In a heel-attaching machine, nailing mechanism and a co-operating jack, a movable nail-loader co-operating therewith, a lever movable between a position in which the loader is free and a position in which said loader is locked against delivery, a lever acting upon the locking lever under the influence of the loader to produce its locking movement, and a lever acting upon the locking lever to release the loader.

20. In a heel-attaching machine, nailing mechanism, a movable loader co-operating therewith, a locking member for the loader, means for controlling the position of the locking member to determine the condition of the loader, and means arranged to shift such control from one element of the machine to another.

21. In a heel-attaching machine, nailing mechanism, a movable loader co-operating therewith, a locking member for the loader, means acting upon the locking member to temporarily retain it in either an effective or ineffective position for locking the loader, and means arranged to alter the position of such retaining means to give it a constant effective tendency.

22. In a heel-attaching machine, nailing mechanism, a movable loader co-operating therewith, a locking member for the loader, a spring acting upon the locking member, and means arranged to vary the application of force of the spring.

23. In a heel-attaching machine, nailing mechanism, a movable loader co-operating therewith, a locking lever for the loader, a spring acting upon the locking lever, and means arranged to vary the position of the spring to cause it to apply its force at either side of the fulcrum of the lever or to apply such force always at one side of the fulcrum 24. In a heel-attaching machine, nailing mechanism, a movable loader co-operating therewith, a locking lever for the loader, a spring connected to the lever, and a member to which the end of the spring opposite the lever is connected, said member being arranged for adjustment to vary the angular relation of the spring to the lever.

In testimony whereof I have signed my name to this specification.

JOSEPH H. POPE.